(12) United States Patent
Hjelmvik

(10) Patent No.: US 6,519,329 B1
(45) Date of Patent: Feb. 11, 2003

(54) VEHICLE PARKING SYSTEM

(75) Inventor: Torbernt Hjelmvik, Järfälla (SE)

(73) Assignee: Modul-System Sweden AB, Järfälla (SE)

( * ) Notice: Subject to any disclaimer, the term of this patent is extended or adjusted under 35 U.S.C. 154(b) by 0 days.

(21) Appl. No.: 09/623,211

(22) PCT Filed: Mar. 17, 1999

(86) PCT No.: PCT/SE99/00420

§ 371 (c)(1),
(2), (4) Date: Aug. 29, 2000

(87) PCT Pub. No.: WO99/48062

PCT Pub. Date: Sep. 23, 1999

(30) Foreign Application Priority Data

Mar. 17, 1998 (SE) .............................................. 9800888

(51) Int. Cl.⁷ .............................................. H04M 11/00
(52) U.S. Cl. ..................................... 379/106.01; 705/13
(58) Field of Search ..................... 379/106.01, 102.01, 379/102.03, 93.02, 93.03, 114.01, 144.01; 703/13; 340/932.2

(56) References Cited

U.S. PATENT DOCUMENTS 5,402,475 A  *  3/1995  Lesner, Jr. et al. ..... 379/106.11
5,940,481 A  *  8/1999  Zeitman ....................... 705/13
5,991,749 A  * 11/1999  Morrill, Jr. .................. 705/13

FOREIGN PATENT DOCUMENTS

| WO | WO 93/20539 | 10/1993 |
| WO | WO 96/11453 | 4/1996 |
| WO | WO 97/19568 | 5/1997 |
| WO | WO 97/35283 | 9/1997 |

* cited by examiner

Primary Examiner—Wing Chan
(74) Attorney, Agent, or Firm—Alfred J. Mangels

(57) ABSTRACT

A parking system in which a mobile telephone can be used to commence and terminate a parking period. A user sends at least one code to a receiving computer at the commencement and termination of a parking period via a mobile telephone system or a permanent telephone system. When a user first connects to the parking system by telephone in order to be able to park the user's vehicle within the system and to communicate parking commencement and termination times with the aid of a telephone, either a pay meter, a cash card terminal, or some corresponding device is caused to read mechanically a cash card that is owned by the user and that is accepted by the parking system as a means of payment. The data read from the cash card is stored in a database in a parking system computer, and at least one user-specific reference is entered and stored in the database and is associated with the cash card data for subsequent identification of the user and for billing the user for parking.

13 Claims, 1 Drawing Sheet

VEHICLE PARKING SYSTEM

BACKGROUND OF THE INVENTION

1. Field of the Invention

The present invention relates to a vehicle parking system, and primarily to a car parking system. More specifically, the invention relates to a parking system in which a mobile telephone can be used for commencing and terminating a parking period.

2. Description of the Related Art

In cities, towns and other municipalities there will be one or more vehicle parking companies who has/have parking meters, so-called pay meters, distributed throughout the city or town in a number of different places, streets, roads and large parking areas are the most common places in this regard.

In recent times, it has become more and more usual to pay parking fees with different types of bank card or cash card, as a supplement to coin payment. When a cash card is used, the person parking a vehicle will draw the card through a card reader on the parking meter.

A known paying system is so arranged that the person parking a vehicle will draw the card through a card reader on the parking meter, whereupon the meter stores the number of the cash card and the time at which the card was read.

The parking meter then issues a receipt, which is placed inwardly of the windshield where it can be seen. When collecting the vehicle, the person concerned must return to the pay meter and again draw the cash card through the card reader of said meter. The pay meter therewith again stores the number of the cash card and compares the time in question with the time at which the cash card was earlier drawn through the card reader. The pay meter then calculates the parking fee and stores the fee together with the number of the card to be charged, and issues a receipt.

All known cash card Systems that use a subsequent billing routine are based on the principle of requiring the person parking a vehicle to visit a parking meter both when commencing a parking period and when terminating said period.

There is known to the art a vehicle parking system in which a parking period is commenced and terminated with the aid of a mobile telephone. According to one such known system described in International Patent Publication No. WO 93/20539 there is sent at the commencement and termination of each parking period, via the mobile telephone, a code that identifies the parking place used, a code that identifies the vehicle concerned, and a code unique to the driver of the vehicle. It is proposed that the fee for parking the vehicle is billed through the standard telephone billing system.

A system of that kind is not easily administered, since the system presumes that at least that the parking company signs some form of agreement with the telephone company. However, the telephone company has no interest in performing billing services without being remunerated.

Furthermore, the system requires the use of many identification items, which renders use of the system unwieldy. These problems are solved by the present invention.

SUMMARY OF THE INVENTION

The present invention thus relates to a parking system in which parking of a vehicle can be commenced and terminated through the medium of a mobile telephone, and where at the commencement and termination of a parking period a user of the system sends at least one code to a receiving computer via a mobile telephone system or a fixed telephone system, when a user wishes to connect himself/herself to the parking system in order to be able to park his/her vehicle with the aid of a telephone, either a pay meter, a cash card terminal or the like, mechanically reads a cash card owned by the user and accepted by the parking system as a means of payment. Data read from the card is stored in a database belonging to the computer of the parking company, and at least one user. Specific reference is stored in and tied together with said data in the database.

BRIEF DESCRIPTION OF THE DRAWINGS

The invention will now be described in more detail with reference to exemplifying embodiments thereof and also with reference to the accompanying drawing, in which.

DESCRIPTION OF THE PREFERRED EMBODIMENTS

The present invention relates to a vehicle parking system with which a mobile telephone can be used to commence and terminate a parking period, and with which at the commencement and the termination of a parking period a user sends at least one code to a receiving computer through the medium of a mobile telephone system or a fixed telephone system. The parking system can thus be used with the aid of both mobile telephones and permanently installed telephones.

Figure 1:
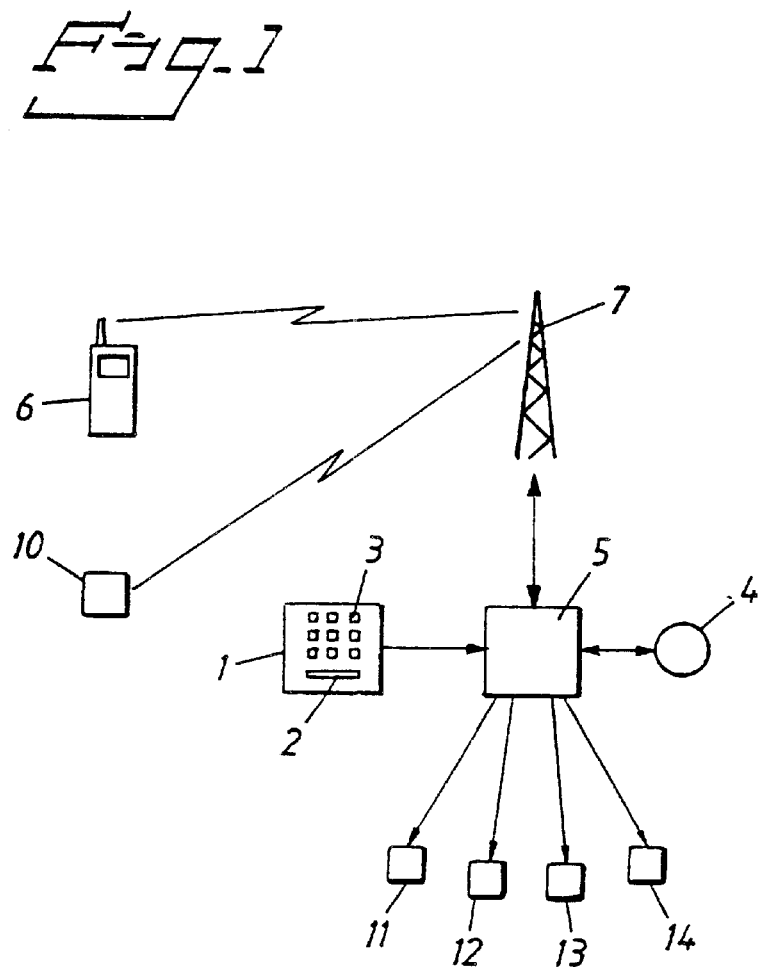
FIG. 1 is a block diagram illustrating an inventive parking system.

When a user wishes to connect himself/herself to the parking system for the first time, in order to be able to park his/her vehicle with the aid of a telephone either a pay meter 1, (see FIG. 1) a cash card terminal, or corresponding device, is caused to mechanically read a cash card that is owned by the user and accepted by the parking system as a means of payment. For instance, the pay meter may be of the kind described in Swedish Patent specification 9601112-7. This type of pay meter includes a cash card reader 2 and a keyboard 3 for keying-in alphanumerical characters. However, the cash card may be read with the aid of a cash card reader in a manned office for the payment of parking fees.

The data read from the card by the cash card reader is stored in a database 4 belonging to the parking system and is also sent conveniently to a server 5 associated with the parking company concerned, said server storing said data in its database 4. At least one user-specific reference is stored in the database 4 and tied to the cash card data stored therein.

The user-specific reference may have various different forms.

According to a first embodiment, the user-specific reference is the number of the telephone to be used in conjunction with a parking period. The telephone number is delivered to the server when a user connects himself/herself to the system.

The telephone number will be sensed by the server 5 of the parking system when the telephone 6 is connected to a telephone number belonging to said system. With regard to a mobile telephone system, e.g. a GSM system, the telephone 6 is connected to the server 5 of the parking company via a base station 7.

According to this method, a parking fee is billed on the cash card concerned, which is tied to the telephone number in the database by sensing the telephone number in question.

According to a second embodiment, the user-specific reference is a personal code for use when parking a vehicle. This code may be a four digit PIN code sent by the user to the server 5 of the parking company over the telephone when parking is commenced or terminated. This code can either be chosen by the user or by the parking system. In this case, the code validates billing of the parking fee to the cash card concerned.

In this latter case, the user can obtain his/her code when connecting with the system, via a printer housed in the pay meter 1, said printer printing out a paper slip on which the code is printed.

A personal code has the advantage of enabling any telephone whatsoever to be used in conjunction with parking a vehicle. The advantage of using the telephone number as a reference is that no code need be delivered to the system.

Figure 2:
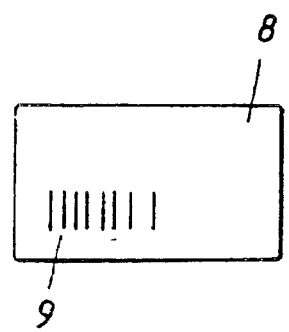
FIG. 2 illustrates one embodiment of a user specific reference.

According to one highly preferred third embodiment of the invention, a plastic card 8 (see FIG. 2) of credit card format is provided when a user joins the system. The plastic card includes a machine readable code that constitutes the user-specific code. The code may, for instance, be a bar code 9 written onto the card. This plastic card 8 is intended to be placed s in the vehicle in a place where it can be read by a parking attendant from outside the parked vehicle.

In the case of this embodiment, the user-specific reference in the form of said plastic card may include the same code as that sent by the user to the system via the telephone. Alternatively, the code on the plastic card may differ from the code sent to the system via the telephone.

According to a preferred embodiment, the telephone number can be sensed by the server 5 when the server is called, said telephone number being one user-specific reference and the code-carrying plastic card being another user-specific reference.

The advantage of using a plastic card having a code that can be read by a card reader from outside the vehicle is that the user is able to park legitimately any vehicle whatsoever, by placing the card in the vehicle concerned in a place where the card can be seen and by telephoning the server 5 of the parking company at the commencement and termination of the parking period. It will be apparent that no vehicle-specific reference is then required in order to operate the system.

However, in one preferred embodiment of the invention a vehicle specific reference, such as the vehicle registration number, can be used in conjunction with the system and entered into said database 4 and then be tied to the entered cash card data together with the user-specific reference in the form of said telephone number or said PIN code. The vehicle registration number may alternatively be entered via the keyboard 3.

One advantage afforded by such an embodiment is that the use of a plastic card is not required and that a parking period can be commenced and terminated by telephone.

According to one highly preferred embodiment, the parking system is informed of the zone in which a vehicle is parked, by telephone, at the commencement of a parking period.

Because parking fees often differ in different parts of a town or city, this embodiment enables the correct parking fee to be charged in accordance with the area in which the vehicle is parked. Moreover, the parking fee for so-called resident parking may be lower than the parking fee for non-residents. The parking zones are conveniently shown on signs, for instance at respective ends of a street. A parking zone may include one or more streets.

The embodiment in which the system is informed of the zone in which a vehicle is parked will also facilitate a check as to whether parking has been reported via the telephone or not.

A parking zone can be indicated in two different ways. One way is for the user to dial the telephone number of the server 5, for instance 1234567, followed by, e.g., a four-digit number of which the three first digits identify the parking zone concerned and the last digit discloses whether the person parking the vehicle is a resident in that zone or not.

Another way is for the user and the server to interact. For instance, the user calls the server 5 by dialling 1234567, wherewith the server generates a synthetic speech asking the user to identify the zone in which the vehicle is parked. The user then enters the number of the parking zone. The server then asks the user if he/she is a resident in the zone concerned, whereafter the user sends, e.g., a digit to the server in response to this query.

When a vehicle-specific reference is entered into the system when a user joins said system, it is beneficial to cause a vehicle-specific reference for two or more vehicles to be entered into the database and there tied to the same cash card data and the same user specific reference, e.g. the user's telephone number stored in said database. In this case, the parking system is informed by telephone that parking of the vehicle concerned is commenced. After having sensed a certain calling telephone number, the server senses that two or more vehicle specific references are tied to the calling telephone number. The server will then deliver the following speech messages for instance, "if you wish to park the vehicle with registration number DSJ 33, press 1; if you wish to park the vehicle with registration number MER 777, press 2, " etc.

In the simplest case, the cash card data, telephone number and vehicle registration number are tied to each other in the database 4 of the server 5.

When parking is commenced, the user need only call the server. The server senses the telephone number and then inquires, e.g., whether parking is to be commenced and then asks the user to enter the number of the parking zone. Parking is therewith commenced.

When parking is terminated, the user again calls the server 5 which therewith senses the telephone number. The server scans the database in which information to the effect that parking has earlier commenced is stored. The server then asks whether parking of the vehicle shall be terminated. The user then appropriately confirms that parking shall be terminated, for instance by entering a code, such as the digit 1.

The server 5 calculates the parking fee on the basis of the time for which the vehicle was parked, the parking zone and the type of parking concerned. The server 5 then ties the parking fee to the cash card read by the parking system at the time when the user connected himself/herself to the system. The cash card company concerned is billed for the parking fee at a later stage, said company, in turn, billing the owner of the cash card, i.e. the user.

In this case, the user need only inform the system of the number of the parking zone at the commencement of a parking period, and confirmation that parking shall be terminated.

In this case, the parking attendants are equipped with a portable communications unit 10 in cordless connection with the server 5. This communications unit may be constructed in accordance with the control unit described in Swedish Patent Specification 9700054-1. The parking attendant enters the parking zone concerned into the control unit and the control unit fetches from the server a so-called parked vehicle list relating to said parking zone, i.e. a list of the registration numbers of those vehicles with which the commencement of a parking period has been announced. The control unit then compares the registration number read-off with the list of parked vehicles and indicates when a commenced parking period has not been announced. The parking attendant then issues a parking fine.

In the alternative case when a user-specific reference in the form of a plastic card is placed in the vehicle where it can be seen, instead of the vehicle registration number, the plastic card is read by the control unit and compared with a list of plastic card codes on which commenced parking periods have been noted.

As will be readily understood from the aforegoing, a user is able to connect himself/herself to the system very easily, regardless of which of the aforesaid embodiments is used. All that the user need do is to find a pay meter 1 that is equipped to receive a connection to the system or to a manual pay office. The cash card is read and a user-specific reference is given or generated. The vehicle registration number is also given, depending on the embodiment used. Connection with the system is then complete, and the user is able to utilize a telephone parking facility. Only a minimum of manual handling is required in connecting a user to the system.

On the basis of existing cash cards belonging to the user, such as American Express, Eurocard, Visa, gasoline pay cards, Smart Cards, etc., that have already been accepted by parking companies for billing purposes, billing of a parking fee can be readily effected by the parking company concerned, simply by said company generating a billing order to respective cash card companies 11–14 in the same way as that used at present for paying a parking fee with a cash card. No change in existing billing routines is therefore necessary.

It will be obvious that the drawbacks mentioned in the introduction are eliminated by the present invention.

Although the invention has been described with reference to a number of exemplifying embodiments thereof, it will be understood that these embodiments can be modified with respect to codes, vehicle specific references, etc.

It is preferred in regard of all embodiments that a parking period can be terminated by passing the cash card through the cash card reader of a pay meter and the user inserting the user specific reference. These data are therewith transferred to the server 5.

It will therefore be understood that the present invention is not restricted to the aforedescribed and illustrated embodiments thereof and that variations can be made within the scope of the following claims.

What is claimed is:

1. A vehicle parking system in which the commencement and the termination of a parking period can be communicated over a telephone system by a user for billing to the user's cash card account, said parking system comprising;

a parking system computer having a database and means for connecting the computer with a telephone system, wherein the database includes stored information corresponding with data contained on a user's cash card and has associated with the user's cash card data information relating to a user-specific reference;

a cash card reader for reading a user's cash card data at the commencement of a business relationship between the user and the parking system, wherein the cash card reader is in communication with the parking system computer database for transmission of the user's cash card data to the database for storage therein;

means for providing at the commencement of a business relationship between the user and the parking system a user-specific reference for transmission to the parking system computer, for storage in the computer's database, and for association therein with the user's cash card data for enabling parking by the user by a telephone communication with the parking system computer;

wherein the parking system computer includes means for receiving telephone transmissions from a user that include the user's user-specific reference both to commence a parking period and to terminate a parking period, means for validating billing of a parking period to the user's cash card account, means for calculating a parking fee corresponding with the parking period, and means for generating a billing order to the cash card company that issued the user's cash card.

2. A parking system according to claim 1, wherein the user-specific reference is the number of a telephone used by the parking system user when commencing a parking period.

3. A parking system according to claim 2, wherein the telephone number of the telephone used by the user is sensed by the parking system computer for comparison with user-specific references stored in the parking system computer database.

4. A parking system according to claim 1, wherein the user-specific reference is a personal code for use by the user when parking a vehicle within the parking system.

5. A parking system according to claim 4, wherein the parking system includes a printer and the user-specific reference is produced by the parking system printer.

6. A parking system according to claim 5, wherein the user-specific reference is carried on a data carrier and is a machine readable code applied to the data carrier.

7. A parking system according to claim 1, wherein a vehicle-specific reference is entered into said database when connecting to the parking system computer, and is associated in the computer database with the cash card data and the user-specific reference stored in said database.

8. A parking system according to claim 7, wherein a vehicle-specific reference for each of at least two vehicles is entered into said database when initially connecting to the system, and the vehicle-specific references are associated in the computer database with the cash card data and the same user-specific reference stored in said database; and wherein the parking system is informed by telephone communication when parking of one of the vehicles concerned commences.

9. A parking system according to claim 1, wherein the parking system is informed by telephone communication of a zone in which parking of a vehicle is commenced.

10. A parking system in accordance with claim 7, wherein the vehicle-specific reference is a vehicle registration number corresponding with the vehicle to be parked within the parking system.

11. A parking system according to claim 5, wherein the parking system includes a pay meter, and the printer is included in the pay meter.

12. A parking system in accordance with claim 6, wherein the data carrier is a plastic card.

13. A method of cash card billing for the cost of parking when parking a vehicle within a parking system that includes a computer having a database, wherein the computer is connected with a telephone system, said method comprising the steps of:

entering into the computer database and storing at the commencement of a business relationship between a user and the parking system information contained on the user's cash card;

entering into the computer database and storing at the commencement of a business relationship between a user and the parking system a user-specific reference for association with the user's cash card data;

associating the user-specific reference with the user's cash card data within the database;

subsequently initiating a parking period by the user by a telephone transmission from the user to the parking system computer;

transmitting during the telephone transmission to the parking system computer the user-specific reference corresponding with the calling user;

validating the commencement of a parking period by comparing the transmitted user-specific reference with user-specific references stored in the parking system computer database;

upon termination of a parking period, transmitting by telephone to the parking system computer database the user's user-specific reference for calculation of the duration of the parking period;

calculating a cost for the parking period; and billing the user's cash card account for the cost of the parking period.

\* \* \* \* \*